United States Patent
Tian et al.

(10) Patent No.: US 10,013,889 B2
(45) Date of Patent: Jul. 3, 2018

(54) METHOD AND SYSTEM FOR ENHANCING INTERACTIONS BETWEEN TEACHERS AND STUDENTS

(71) Applicant: KONICA MINOLTA LABORATORY U.S.A., INC., San Mateo, CA (US)

(72) Inventors: Yibin Tian, Menlo Park, CA (US); Wei Ming, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 532 days.

(21) Appl. No.: 14/230,949

(22) Filed: Mar. 31, 2014

(65) Prior Publication Data

US 2015/0279222 A1  Oct. 1, 2015

(51) Int. Cl.
*G09B 5/00* (2006.01)
*G09B 7/02* (2006.01)

(52) U.S. Cl.
CPC .............. *G09B 5/00* (2013.01); *G09B 7/02* (2013.01)

(58) Field of Classification Search
CPC ... G09B 5/00; G09B 5/02; G09B 5/04; G09B 5/06; G09B 5/08; G09B 5/10; G09B 5/12; G09B 3/00; G09B 3/04; G09B 3/06; G09B 3/08; G09B 2/10; G09B 7/00; G09B 7/02; G09B 7/04; G09B 7/06; G09B 7/07; G09B 7/08; G09B 7/10; G09B 7/12; G06F 17/30811; G06K 9/62; G06K 9/6202; G06K 9/6203; G06T 7/0022; G06T 7/001
USPC ........................................................ 434/350
See application file for complete search history.

(56) References Cited

U.S. PATENT DOCUMENTS

| | | | |
|---|---|---|---|
| 6,349,001 B1 | 2/2002 | Spitzer | |
| 7,013,009 B2 | 3/2006 | Warren | |
| 7,401,918 B2 | 7/2008 | Howell et al. | |
| 8,582,816 B2 * | 11/2013 | Lee | G06K 9/00771 382/103 |

(Continued)

FOREIGN PATENT DOCUMENTS

| | | |
|---|---|---|
| JP | 2011-109462 A | 6/2011 |
| JP | 2011-191767 A | 9/2011 |

OTHER PUBLICATIONS

Miksik, O. et al., "Evaluation of Local Detectors and Descriptors for Fast Feature Matching", 21st International Conference on Pattern Recognition, pp. 2681-2684 (Nov. 11-15, 2012).*

(Continued)

*Primary Examiner* — Thomas Hong
(74) *Attorney, Agent, or Firm* — Buchanan Ingersoll & Rooney PC

(57) ABSTRACT

A method, computer program product, and a system for enhancing an interaction between a teacher and a student are disclosed, the method includes receiving video images of a region of interest from a plurality of multi-functional devices; comparing the video images of the region of interest received from the plurality of multi-functional devices; detecting differences in the region of interest of at least one multi-functional device in comparison to the region of interest of the plurality of multi-functional devices; and providing a signal to the at least one multi-functional device based on the detected difference in the region of interest.

20 Claims, 5 Drawing Sheets

(56) References Cited

U.S. PATENT DOCUMENTS

| | | | |
|---|---|---|---|
| 2007/0117082 A1 | 5/2007 | Winneg et al. | |
| 2011/0207108 A1 | 8/2011 | Dorman | |
| 2011/0244919 A1* | 10/2011 | Aller | G06K 9/00973 455/556.1 |
| 2012/0034584 A1 | 2/2012 | Logan et al. | |
| 2012/0251992 A1* | 10/2012 | Huerta | G09B 7/00 434/350 |
| 2014/0051054 A1 | 2/2014 | Wong et al. | |

OTHER PUBLICATIONS

International Search Report and Written Opinion of the International Searching Authority dated Jun. 17, 2015 in corresponding International Application No. PCT/US15/22653 (8 pages).

Kolsch, M. et al., "Robust Hand Detection", pp. 1-6.

Kasai, I. et al., "A Forgettable Near Eye Display", IEEE, pp. 115-118 (2000).

Wienecke, M. et al., "Video-Based Whiteboard Reading", International Journal on Document Analysis and Recognition Manuscript, pp. 1-20.

Liebowitz, D. et al., "Metric Rectification for Perspective Images of Planes", Robotics Research Group, pages 1-7.

Jagannathan, L. et al., "Perspective Correction Methods for Camera-Based Document Analysis", International Institute of Information Technology, pp. 148-154.

\* cited by examiner

METHOD AND SYSTEM FOR ENHANCING INTERACTIONS BETWEEN TEACHERS AND STUDENTS

FIELD

The present application relates to a method and system for enhancing interactions between teachers and students.

BACKGROUND

In a classroom setting, students sit across the room and view teacher's presentation from different perspectives. For example, sometimes, the teacher's presentation can include writing and/or drawing on a whiteboard/blackboard, may be occluded or blocked by the teacher, other students, furniture and the like for students on one side of the room while students on the other side can see it clearly.

In addition, today's interactions between teachers and students can depend on the attention of the teacher. For example, when the teacher is busy explaining materials or demonstrating procedures, he/she may not be paying attention to the students. It is also common that the teacher may unintentionally ignore some students while interacting with others.

SUMMARY

In consideration of the above issues, it would be desirable to have a method and system for enhancing interactions between teachers and students, which can address some of the limitations set forth above.

In accordance with an exemplary embodiment, a method for enhancing an interaction between a teacher and a student using multi-functional devices is disclosed, the method comprising: receiving video images of a region of interest from a plurality of multi-functional devices; comparing the video images of the region of interest received from the plurality of multi-functional devices; detecting differences in the region of interest of at least one multi-functional device in comparison to the region of interest of the plurality of multi-functional devices; and providing a signal to the at least one multi-functional device based on the detected difference in the region of interest.

In accordance with an exemplary embodiment, a computer program product comprising a non-transitory computer readable medium having a computer readable code embodied therein for enhancing an interaction between a teacher and a student is disclosed, the computer readable program code configured to execute a process, which includes the steps of: receiving video images of a region of interest from a plurality of multi-functional devices; comparing the video images of the region of interest received from the plurality of multi-functional devices; detecting differences in the region of interest of at least one multi-functional device in comparison to the region of interest of the plurality of multi-functional devices; and providing a signal to the at least one multi-functional device based on the detected difference in the region of interest.

In accordance with an exemplary embodiment, a system for enhancing an interaction between a teacher and a student is disclosed, the system comprising: a plurality of multi-functional devices configured to provide at least video images of a region of interest; and a computer configured to: receive video images of the region of interest from the plurality of multi-functional devices; compare the video images received from the plurality of multi-functional devices of the region of interest; detect differences in the region of interest of at least one multi-functional device in comparison to the region of interest of the plurality of multi-functional devices; and provide a signal to the at least one multi-functional device based on the detected difference in the region of interest.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate exemplary embodiments of the disclosure and, together with the description, serve to explain the principles of the disclosure. In the drawings.

DESCRIPTION OF THE PREFERRED EMBODIMENTS

In accordance with an exemplary embodiment, a system and method is disclosed that can provide an unobstructed view of a teacher's presentation for each and every student in the classroom by displaying a synthesized video (or image) on a display of a student's multi-functional device (MFD) using videos (or images) obtained from front-facing video cameras on the MFD device when an occlusion happens and/or alternatively, a student desires to receive the synthesized video.

In accordance with an exemplary embodiment, a system and method is disclosed that can analyze audio and video from microphones and video cameras, respectively, and movement signals from tilt sensors or accelerometers, and can provide teachers with information about each student's class participation including visual attention and/or behavior status. In addition, the system and method as disclosed herein can allow teachers to individually interact with students, for example, by sending private message or queries to students who show insufficient class participation or visual attention to the teacher's presentation, and/or alternatively, abnormal behavior pattern.

In accordance with an exemplary embodiment, student class participation, visual attention, and behavior pattern over time can be analyzed to help the teacher learn student characteristics and improve his/her personalized teaching strategies.

For example, in accordance with an exemplary embodiment, the video synthesizing procedure can include a presentation on a whiteboard/blackboard in the classroom, as is typical in many classrooms. If the presentation is done electronically (for example, projected from a computer), the content can be distributed directly to the students via a multi-functional device (MFD) as disclosed herein and the video synthesis disclosed herein may not be necessary.

Figure 1:
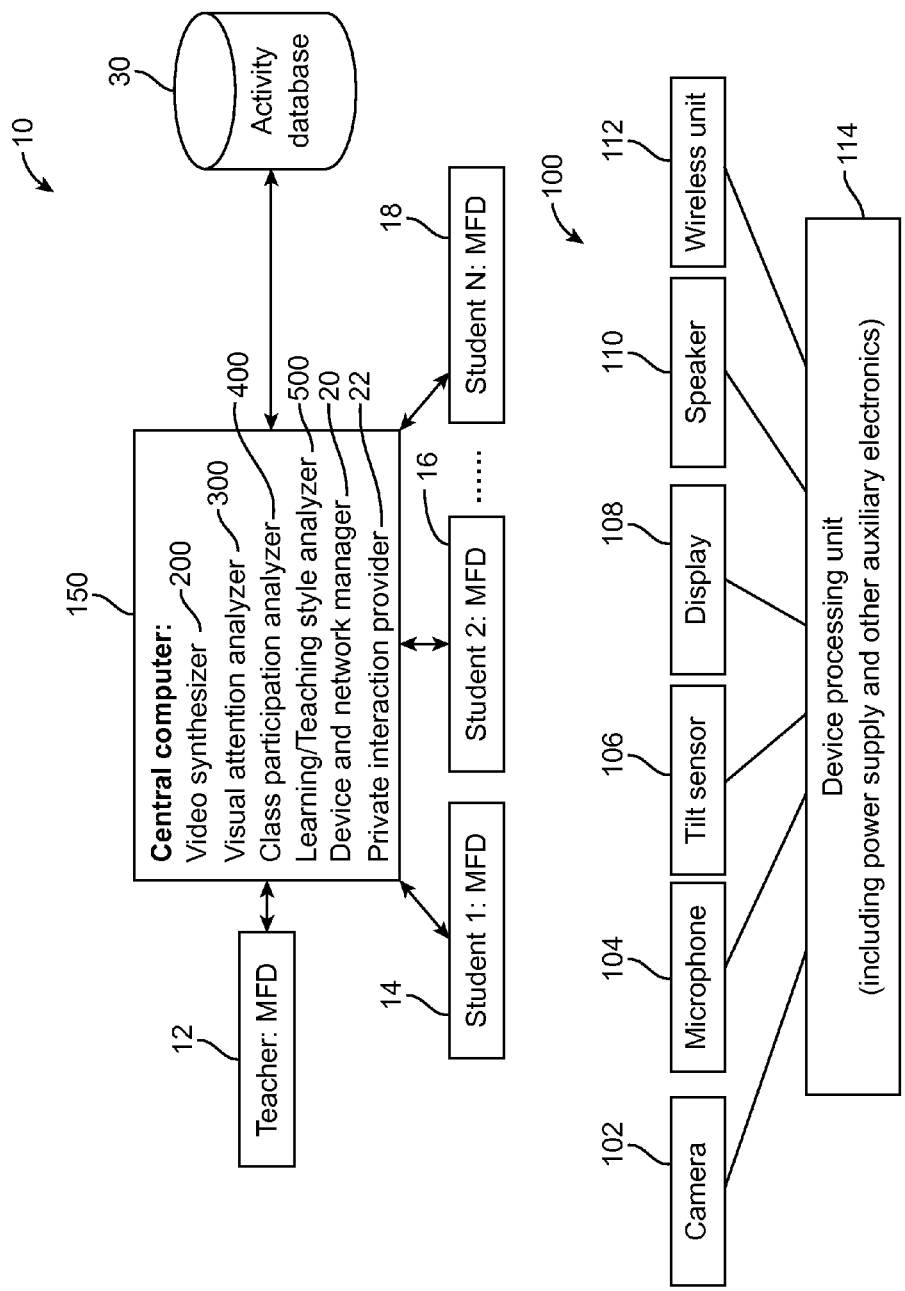
FIG. 1 is an illustration of a system for enhancing interactions between teachers and students in accordance with an exemplary embodiment.

FIG. 1 is an illustration of a system 10 for enhancing interactions between teachers and students in accordance with an exemplary embodiment. As shown in FIG. 1, the system 10 can include a plurality of multi-functional devices (MFDs) 100 that can be configured to be worn by the teacher and students. In accordance with an exemplary embodiment, the multi-functional devices (MFDs) 100 can be configured to be wirelessly connected and managed by a computer 150, for example, a central computer, in a classroom or classroom-like setting. For example, the classroom-like setting can include at least one teacher 12, and a plurality of students 14, 16, 18, for example, student 1, student 2, . . . student N.

In accordance with an exemplary embodiment, the central computer 150 can be configured to analyze and store outputs from each of the plurality of MFDs 100 to a local or remote activity database 30. The activity database 30 is preferably part of the computer 150, however, the activity database 30 can also be a separate server, which is in communication with the computer 150. The computer 150 can include, for example, a CPU (Central Processing Unit), a RAM (Random Access Memory), a ROM (Read Only Memory), a networking unit, and an operating system (OS).

In accordance with an exemplary embodiment, each of the plurality of MFDs 100 can be equipped with, for example, a front-facing camera 102, a microphone 104, a tilt sensor or accelerometer 106, a display 108, a speaker 110, a wireless communication unit (or networking unit) 112, and a device processing unit 114. The device processing unit 114 can include, for example, a power supply and other auxiliary electronics components. The wireless communication unit or networking unit 112, for example, can be a radio frequency (RF) and/or infrared (IR) transmission. In accordance with an exemplary embodiment, the MFD 100 can be a light-weighted head-mounted device, for example, Google® Glass.

In accordance with an exemplary embodiment, the system 10 can be configured to synthesize a video (or video stream) for a region of interest, for example, a presentation region in a classroom setting, using videos obtained from one or more front-facing video cameras 102 on the MFD 100. For example, when an occlusion or some obstruction prevents one or more students 14, 16, 18 from seeing, for example, a whiteboard and/or the teacher 12, and/or alternatively, a student 14, 16, 18, wishes out of personal need and/or preference to have the presentation region, for example, on the whiteboard, the region of interest can be displayed on the display 108 of the device 100.

In accordance with an exemplary embodiment, the system 10 can also analyze abnormal visual attention patterns of one or more of the plurality of students 14, 16, 18, which are equipped or wearing MFDs 100 based on the use of videos from the camera 102 and/or signals from tilt sensors 106 on the MFDs 100. For example, if one student 14, 16, 18 keeps looking out a window and/or towards another object, for example, another student, while other students 14, 16, 18 are looking at the whiteboard or blackboard, the system 10 can be configured to send a reminder, a message, and/or a query, which is preferably private, to the student 14, 16, 18 via his/her MFD 100 regarding her/his inattention. In addition, the system 10 can be configured to send a warning to the teacher 12 indicating that timely interactions between the teacher 12 and the student 14, 16, 18 should be initiated, for example, when more than one student 14, 16, 18 appears inattentive and/or not paying attention to the presentation and/or lecture.

In accordance with an exemplary embodiment, the central computer 150 can be equipped with a video synthesizer 200, a video attention analyzer 300, an audio-based class participation analyzer 400, and an overall class participation analyzer 500, which can also be referred to as a learning and/or teaching analyzer. In addition, the computer 150 can be equipped with a device and network manager 20 and/or a private interaction provider 22. The device and network manager 20 can be configured to receive wireless signals from each of the plurality of MFDs 100.

In accordance with an exemplary embodiment, for example, the system 10 can also combine results from a visual attention analyzer 300 (FIG. 3) with microphone 104 recordings to estimate students' class participation. In addition, with accumulated data in the activity database 30, teaching styles and effectiveness and different students' learning characteristics can be analyzed and compared with classes having similar and/or different number of students, structure, teachers and/or teaching styles.

Figure 2:
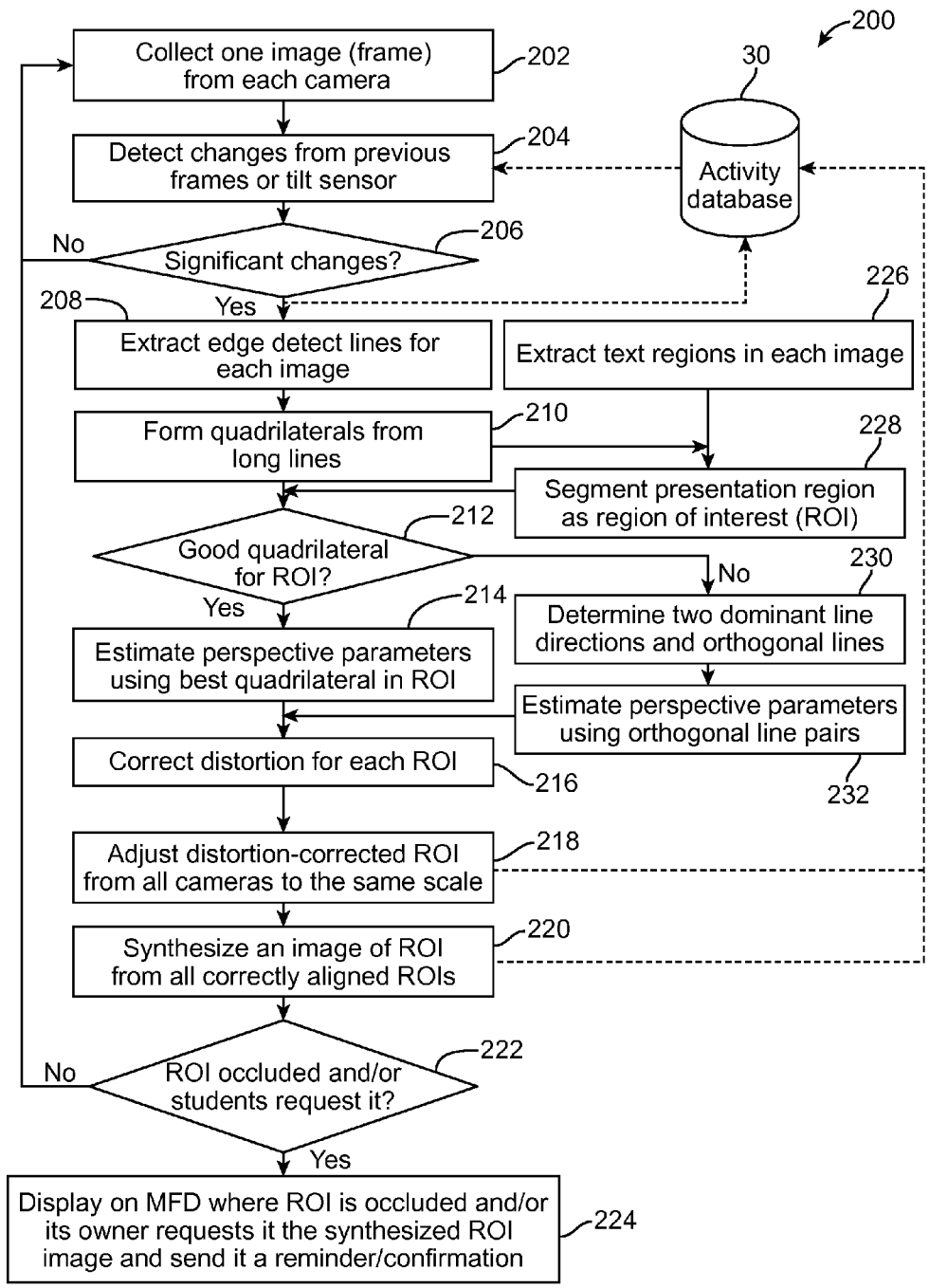
FIG. 2 is a workflow of a video synthesizer for enhancing interactions between teachers and students in accordance with an exemplary embodiment.

FIG. 2 is a workflow of a video synthesizer 200 for enhancing interactions between teachers and students in accordance with an exemplary embodiment. As shown in FIG. 2, the workflow for the video synthesizer 200 can include in step 202 collecting at least one image (or frame) from preferably each of the cameras 102 associated with the plurality of MFDs 100. The at least one image (or frame) from the camera 102 can be input into the activity database 30 for later use, or stored for processing on individual MFDs 100. In step 204, the video synthesizer 200 can be configured to detect changes from previous frames and/or a tilt sensor 106 associated with the MFD 100 using previous images or frames, which have been input (or saved) in the activity database 30 and/or MFD 100.

In step 206, the video synthesizer 200 can be configured to determine if a significant change from one frame to another frame has occurred, and/or alternatively, significant change associated with the tilt sensor 106 of the MFD 100. If a significant change has not occurred, the process returns to step 202, wherein another image or frame can be collected and analyzed. It can be appreciated that a significant change can be determined by comparing one image or frame to another image or frame and if the region of interest is different, for example, the student is no longer looking at the whiteboard or blackboard.

In accordance with an exemplary embodiment, in step 208, if a significant change has been identified, edge lines are detected and extracted for each image. In step 210, a quadrilateral can be formed from the long lines of the image. In step 226, text regions for each image can also be extracted. In step 228, segmenting presentation region as the region of interest (ROI) can be performed and provided to step 212 for further processing.

In step 212, a determination can be made if a good quadrilateral for the region of interest can be obtained based on the image or frame. For example, a good quadrilateral can be one that is likely formed by the boundaries of the whiteboard/blackboard, and/or, for example, based on one or more of the following criteria: height, width, aspect ratio, and location of the whiteboard/blackboard, minimum and maximum perspective angles of the camera, and/or minimum and maximum viewing distances of the cameras. In accordance with an exemplary embodiment, the criteria can be based on an assumption that the white/black board is rectangular. If the determination is made that a good quadrilateral for the ROI can be made, in step 214, perspective parameters using best quadrilateral for the region of interest (ROI) can be estimated, for example, by using a method such as disclosed in Liebowitz, D.; Zisserman, A, "Metric rectification for perspective images of planes," *IEEE Computer Society Conference on Computer Vision and Pattern Recognition*, pp. 23-25, 1998. In step 216, the distortion for each ROI can be corrected.

If a good quadrilateral for the region of interest cannot be achieved in step 212, the process proceeds to step 230, for determination if two dominant line directions and orthogonal lines can be achieved. It can be appreciated that the determination of orthogonal lines is based on the assumption that the whiteboard/blackboard is rectangular. In step 232, perspective parameters using orthogonal line pairs can be performed, and since orthogonal lines form a right angle, this can be done using an established method, for example, as disclosed in Liebowitz, which results are then fed into step 216, wherein the distortion for each ROI can be corrected. In steps 212 and 230, additional information may be utilized to facilitate the determination of whether a quadrilateral or a pair of orthogonal lines is formed by the whiteboard/blackboard, for example, the color of the background within it convex hull is either white/black, and the foreground within its convex hull is likely to be handwritten texts or drawings.

In accordance with an exemplary embodiment, in step 218, an adjustment of the distortion-corrected ROI from each of the camera angles to a similar or the same scale can be performed using the data stored in the activity database 30. In step 220, an image of ROI from each correctly aligned ROIs can be synthesized using the data stored in the activity database 30.

In step 224, the synthesized ROI image can be displayed on the display 108 of the MFDs 100 for each student 14, 16, 18, where the region of interest (ROI) is occluded and/or the user of the MFD 100 has requested it based on the determination in step 222. In accordance with an exemplary embodiment, the synthesized ROI image can either be displayed as is, or further enhanced to suit the need of the students, for example, by digitally magnifying the synthesized ROI image for students with poor vision. In addition, in step 224, a reminder and/or confirmation can also be sent to the MFD 100 of each of the students 14, 16, 18 receiving the synthesized ROI image.

In accordance with an exemplary embodiment, steps 202-216 and 226-232 can be performed on a processing unit 114 of each of the plurality of MFDs 100, or alternatively performed on the central computer 150 and the results received and/or sent from the computer 150 via the wireless unit 112 of the MFD 100.

Figure 3:
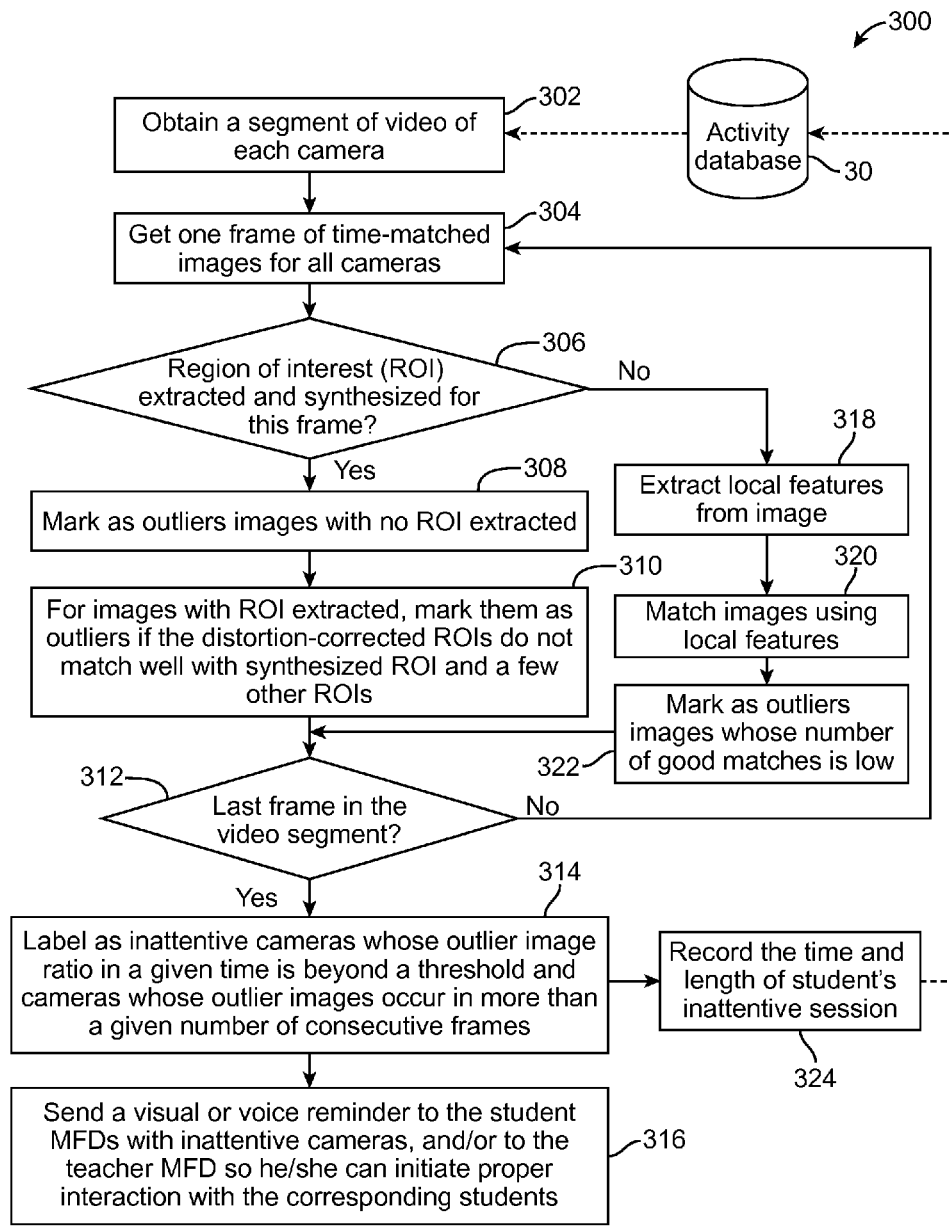
FIG. 3 is a workflow for a visual attention analyzer for enhancing interaction between teachers and students in accordance with an exemplary embodiment.

FIG. 3 is a workflow for a visual attention analyzer 300 for enhancing interaction between teachers and students in accordance with an exemplary embodiment. As shown in FIG. 3, the visual attention analyzer 300 can be configured in step 302 to obtain a segment of video from one or more, and preferably, each of the cameras 102 on the student's MFD 100. In step 304, the visual attention analyzer 300 can obtain at least one frame of time-matched images from each of the cameras 102. In step 306, a determination can be made if a region of interest (ROI) can be extracted and synthesized for each of the frames. In step 308, images with no ROI extracted are marked as outliers. In step 310, images with a ROI extracted can be marked as outliers if the distortion-corrected ROIs do not match well with the synthesized ROI and/or with other ROIs.

In accordance with an exemplary embodiment, if the region of interest (ROI) cannot be extracted, in step 318, local features can be extracted from the image. For example, the local features can be one or more of the combination of many existing image features suitable for real-time implementation, such as simple corners, edges, blobs, or more sophisticated MSER, SURF and FAST etc., as disclosed, for example, in Miksik, O.; Mikolajczyk, K., "Evaluation of local detectors and descriptors for fast feature matching," $21^{st}$ *International Conference on Pattern Recognition (ICPR)*, pp. 11-15, 2012. In step 320, images using local features can be matched. In step 322, images having a number of matches, which do not meet a predetermined threshold, for example, having a low number of matches, can be marked as outliers.

In step 312, a determination can be made if the frame in the video segment is the last frame in the video segment. If the frame in the video segment is not the last frame, the process returns to step 304. If the frame is the last frame in the video, the process continues to step 314, wherein cameras 102 having an outlier image ratio for a given time is beyond a predetermined threshold and/or cameras 102 having outlier images occurring in more than a given number of consecutive frames can be labeled as inattentive. In step 316, a visual or voice reminder can be sent to the student MFDs 100 with inattentive cameras, and/or to the teacher MFD 100 so he/she can initiate proper interaction with the corresponding student 14, 16, 18. In addition, in step 324, the time and length of a student's inattentive session can be recorded.

Figure 4:
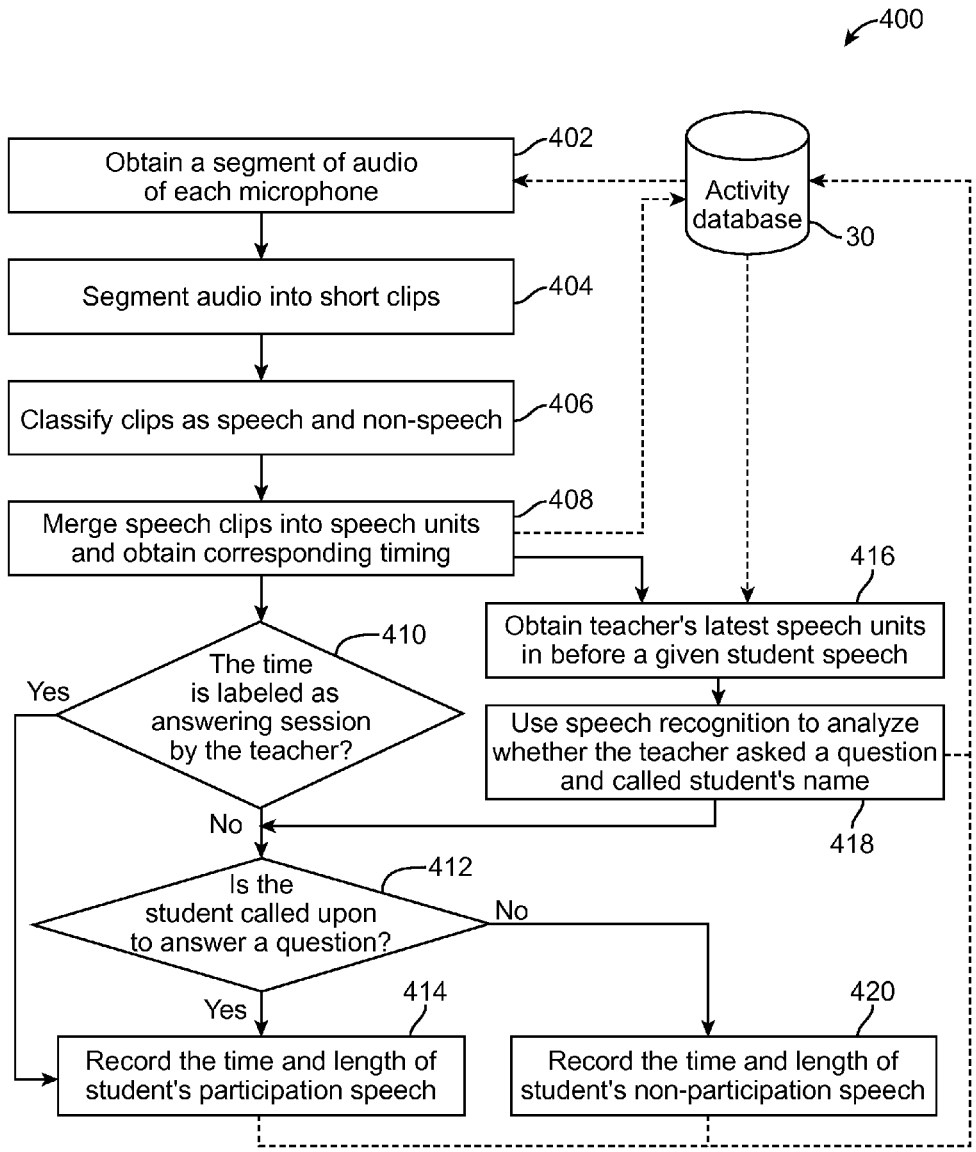
FIG. 4 is a workflow for an audio-based class participation analyzer in accordance with an exemplary embodiment.

FIG. 4 is a workflow for an audio-based class participation analyzer 400 in accordance with an exemplary embodiment. As shown in FIG. 4, the process of the audio-based class participation analyzer 400 can include in step 402, obtaining a segment of audio (or audio clip) from each of the microphones 104 of the MFDs 100. In step 404, each of the audio clips can be segmented into short audio clips. In step 406, each of the short audio clips can be classified as speech and non-speech. In step 408, speech clips can be merged into speech units and corresponding timing can be obtained and can be input into the activity database 30.

In step 410, a determination can be made if the audio clip is answering a question or an answering/discussion session by the teacher. If the audio clip is identified as answering a question or an answering/discussion session by the teacher, in step 414, the process records the time and length of the student's participation or speech. If the audio clip is not identified as an answering/discussion session by the teacher, in step 412, a determination can be made if the student was called upon by the teacher to answer a question or not. If it determined that the student was called upon by the teacher, the process continues to step 414, where the time and length of the student's participation or speech is recorded. If it is determined that the student was not called upon by the teacher, the process continues to step 420, where the time and length of the student's non-participation is recorded.

In accordance with an exemplary embodiment, in step 416, the teacher's latest speech units before a given student's speech can be obtained. In step 418, speech recognition can be used to analyze whether the teacher asked a question and/or called upon a student based on data recorded and input into the activity database 30.

Figure 5:
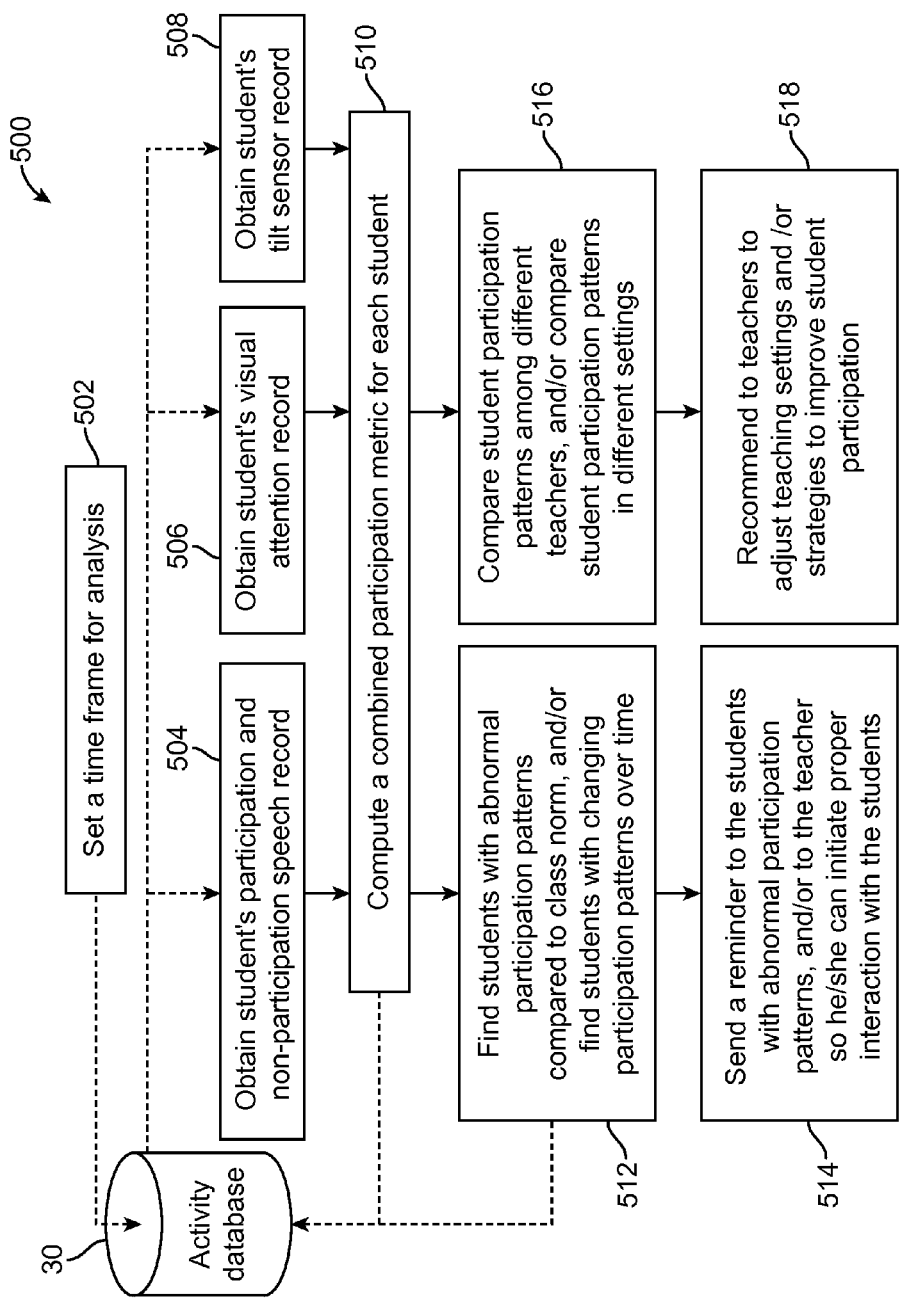
FIG. 5 is a workflow for an overall class participation analyzer in accordance with an exemplary embodiment.

FIG. 5 is a workflow for an overall class participation analyzer 500 in accordance with an exemplary embodiment. As shown in FIG. 5, in step 502, a time-frame for each analysis can be set. In step 504, a student's participation and non-participation speech record can be obtained. In step 506, a student's visual attention record can be obtained. In step

508, a student's tilt sensor record can be obtained. In step 510, the data obtained in steps 504, 506, and 508 can be then be combined to calculate or compute a participation metric for each student based on the data input into the activity database 30. In step 512, students with abnormal participation patterns compared to normal classroom participation can be identified, and/or students 14, 16, 18 with changing participation patterns over time can be identified. In step 514, a reminder can be sent to the students 14, 16, 18 with abnormal participation patterns, and/or a reminder can be sent to the teacher 12 so he/she can initiate proper interaction with the students 14, 16, 18.

In accordance with an exemplary embodiment, in step 516, student participation patterns, among different teachers can be compared, and/or student participation patterns in different settings can be compared. In step 516, a recommendation can be sent, for example, to a teacher 12, that adjustments to the teaching settings and/or strategies can be provided to improve student participation, for example, by rearranging the classroom, moving one or more students to different locations within the classroom, and/or separating one or more students. In addition, a teacher's teaching style and responsibility can be assessed, for example, through the frequency of interactions between students and the teacher, the time spent on writing on the white/black board versus explanation and discussion, and if there is timely action when inappropriate or abnormal/strange behavior is observed or reported.

In accordance with an exemplary embodiment, for example, a student participation metric can be generated using a vector based on one or more of the following participation quantities. For example, an 8-element vector can be used as a participation metric, which can include:

(Nv, Tv, Nsp, Tsp, Nsn, Tsn, Nm, Tm)
Nv: Number of inattentive visual sessions
Tv: Total time of inattentive visual sessions
Nsp: Number of participation speeches
Tsp: Total time of participation speeches
Nsn: Number of non-participation speeches
Tsn: Total time of non-participation speeches
Nm: Number of high-frequency motion sessions
Tm: Total time of high-frequency motion sessions In accordance with an exemplary embodiment, the time frame for analysis can be very different for different purposes. For example, to find abnormal participation patterns of students in one class session, the time frame can be, for example, at least 1 to 2 minutes to tens of minutes. To compare student participation patterns among different teachers, the time frame can be at least days or weeks.

In accordance with an exemplary embodiment, a computer program product comprising a non-transitory computer readable medium having a computer readable code embodied therein for enhancing an interaction between a teacher and a student is disclosed, the computer readable program code configured to execute a process, which includes the steps of: receiving video images of a region of interest from a plurality of multi-functional devices; comparing the video images of the region of interest received from the plurality of multi-functional devices; detecting differences in the region of interest of at least one multi-functional device in comparison to the region of interest of the plurality of multi-functional devices; and providing a signal to the at least one multi-functional device based on the detected difference in the region of interest.

The non-transitory computer usable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

The present invention includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to".

In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure.

In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A method for enhancing an interaction between a teacher and a student using multi-functional devices, the method comprising:
receiving real-time video images for a region of interest from a plurality of multi-functional devices, the region of interest being a presentation region in a classroom setting, the presentation region comprising a whiteboard and/or a blackboard, and wherein each student in the classroom setting is fitted with one of the plurality of multi-functional devices having a front facing camera;
comparing the real-time video images received from the plurality of multi-functional devices;
detecting differences in the region of interest of the real-time video images of the plurality of multi-functional devices;
generating a participation metric for each student based on the detected differences in the real-time video images of the plurality of multi-functional devices, the participation metric comprising a visual attention record for each of the plurality of multi-functional devices; and providing a signal to one or more of the plurality of multi-functional devices based on the detected differences in the real-time video images and the participation metric for each student, if the participation metric of the one or more multi-functional devices is different from the plurality of multi-functional devices and/or the participation metric changes over a predetermined time frame for the student of the one or more multi-functional devices.

2. The method of claim 1, wherein the step of providing a signal comprises:

alerting each of the students of the one or more multi-functional devices that video images of the real-time video images provided by the one or more multi-functional devices is different from the real-time video images of the plurality of multi-functional devices and/or the participation metric has changed over the predetermined time frame.

3. The method of claim 1, wherein the step of providing a signal comprises:

synthesizing a plurality of video images received from each of the plurality of multi-functional devices and producing a synthesized image; and providing the synthesized image to a display of the one or more multi-functional devices.

4. The method of claim 1, wherein the step of comparing the real-time video images received from the plurality of multi-functional devices comprises:

extracting edge lines for each image received from the plurality of multi-functional devices;

forming a quadrilateral from long lines of each image;

if a quadrilateral for the each image can be formed, estimating perspective parameters using a best quadrilateral for the each image;

if the quadrilateral for the each image cannot be formed, determining two dominant line directions and two orthogonal lines, and estimating the perspective parameters using the two dominant line directions and the two orthogonal lines;

correcting distortion for the each image;

adjusting corrected distortion for each of the plurality of cameras to a same scale; and synthesizing an image from all correctly aligned images received from the plurality of multi-functional devices.

5. The method of claim 4, wherein the step of comparing the video images received from the plurality of multi-functional devices comprises:

obtaining at least one frame of time-matched images from two or more cameras;

extracting a time-matched image from each of the time-matched images;

marking as outlier images without the time-matched image, and for time-matched images with the time-matched image, marking the time-matched images as outlier, if the distortion corrected regions of interest do not match with a synthesized time-matched image; and labeling at least one camera as inattentive, if the at least one camera outlier is beyond a defined threshold.

6. The method of claim 1, wherein each of the plurality of multi-functional devices is equipped with an audio device, and comprising:

obtaining segments of audio from each of the plurality of multi-functional devices;

segmenting each of the segments of audio into one or more individual segments; and classifying each of the segments of audio into speech and non-speech units for each of the plurality of multi-functional devices.

7. The method of claim 6, comprising:

classifying the speech units into responsive and non-responsive segments; and recording a time and length of each responsive speech segments.

8. The method of claim 7, wherein each of the plurality of multi-functional devices is equipped with a tilt sensor configured to detect changes in a relative position of the multi-functional device, and comprising:

inputting tilt reading into the computer from the tilt sensor from each of the plurality of multi-functional devices; and detecting if one or more of the plurality of multi-functional devices exhibit significant changes in the tilt reading.

9. The method of claim 8, comprising:

computing a combined participation metric for each of the plurality of multi-functional devices, wherein computing the combined participation metric for each of the plurality of multi-functional devices comprises one or more of the following:

number of inattentive visual sessions;
total time of inattentive visual sessions;
number of participation speeches;
total time of participation speeches;
number of non-participation speeches;
total time of non-participation speeches;
number of high-frequency motion sessions; and
total time of high-frequency motion sessions.

10. The method of claim 9, comprising:

comparing the combined participation metric for each of the plurality of multi-functional devices in one or more classroom settings to obtain student participation patterns; and comparing the student participation patterns among the one or more classroom settings.

11. A computer program product comprising a non-transitory computer readable medium having a computer readable code embodied therein for enhancing an interaction between a teacher and a student, the computer readable program code configured to execute a process, which includes the steps of:

receiving real-time video images for a region of interest from a plurality of multi-functional devices, the region of interest being a presentation region in a classroom setting, the presentation region comprising a whiteboard and/or a blackboard, and wherein each student in the classroom setting is fitted with one of the plurality of multi-functional devices having a front facing camera;

comparing the real-time video images received from the plurality of multi-functional devices;

detecting differences in the region of interest of the real-time video images of the plurality of multi-functional devices;

generating a participation metric for each student based on the detected differences in the real-time video images of the plurality of multi-functional devices, the participation metric comprising a visual attention record for each of the plurality of multi-functional devices; and providing a signal to one or more of the plurality of multi-functional devices based on the detected differences in the real-time video images and the participation metric for each student, if the participation metric of the one or more multi-functional devices is different from the plurality of multi-functional devices and/or the participation metric changes over a predetermined time frame for the student of the one or more multi-functional devices.

12. The computer program product of claim 11, wherein the step of providing a signal comprises:
alerting each of the students of the one or more multi-functional devices that video images of the real-time video images provided by the one or more multi-functional devices is different from the real-time video images of the plurality of multi-functional devices and/or the participation metric has changed over the predetermined time frame.

13. The computer program product of claim 11, wherein the step of providing a signal comprises:
synthesizing a plurality of video images of the real-time video images received from each of the multi-functional devices and producing a synthesized image of the real-time video images; and
providing the synthesized image of the real-time video images to a display of the one or more multi-functional devices.

14. The computer program product of claim 11, wherein each of the multi-functional devices is equipped with an audio device, and comprising:
obtaining segments of audio from each of the plurality of multi-functional devices;
segmenting each of the segments of audio into one or more individual segments;
classifying each of the segments of audio into speech and non-speech units;
classifying the speech units into responsive and non-responsive segments; and
recording a time and length of each responsive speech segments.

15. The computer program product of claim 11, wherein each of the plurality of multi-functional devices with a tilt sensor configured to detect changes in a relative position of the plurality of multi-functional device, and comprising:
inputting tilt reading into the computer from the tilt sensor from each of the plurality of multi-functional devices; and
detecting if one or more of the plurality of multi-functional devices exhibit significant changes in the tilt reading.

16. A system for enhancing for enhancing an interaction between a teacher and a student, the system comprising:
a plurality of multi-functional devices configured to provide real-time video images for a region of interest, the region of interest being a presentation region in a classroom setting, the presentation region comprising a whiteboard and/or a blackboard, wherein each student in the classroom setting is fitted with one of the plurality of multi-functional devices having a front facing camera; and
a computer configured to:
receive the real-time video images of the region of interest from the plurality of multi-functional devices;
compare the real-time video images received from the plurality of multi-functional devices;
detect differences in the region of interest of the real-time video images of the plurality of multi-functional devices;
generate a participation metric for each student based on the detected differences in the real-time video images of the plurality of multi-functional devices, the participation metric comprising a visual attention record for each of the plurality of multi-functional devices; and
provide a signal to one or more of the plurality of multi-functional devices based on the detected differences in the real-time video images and the participation metric for each student, if the participation metric of the one or more multi-functional devices is different from the plurality of multi-functional devices and/or the participation metric changes over a predetermined time frame for the student of the one or more multi-functional devices.

17. The system of claim 16, comprising:
alerting each of the students of the one or more multi-functional devices that video images of the real-time video images provided by the one or more multi-functional devices is different from the real-time video images of the plurality of multi-functional devices and/or the participation metric has changed over the predetermined time frame.

18. The system of claim 16, wherein the computer is configured to:
synthesize a plurality of video images of the real-time video images received from each of the plurality of multi-functional devices and producing a synthesized image of the real-time video images; and
provide the synthesized image of the real-time video images to a display of the one or more multi-functional devices.

19. The system of claim 16, wherein each of the multi-functional devices is equipped with an audio device; and
the computer is configured to:
obtain segments of audio from each of the plurality of multi-functional devices;
segment each of the segments of audio into one or more individual segments;
classify each of the segments of audio into speech and non-speech units;
classify the speech units into responsive and non-responsive segments; and
record a time and length of each responsive speech segments.

20. The system of claim 16, wherein each of the plurality of multi-functional devices is equipped with a tilt sensor configured to detect changes in a relative position of the multi-functional device; and
the computer is configured to:
receive tilt readings from the tilt sensor from each of the plurality of multi-functional devices; and
detect if one or more of the plurality of multi-functional devices exhibit significant changes in the tilt reading.

* * * * *